United States Patent [19]

Chandalia et al.

[11] 4,258,148

[45] Mar. 24, 1981

[54] GRAFT COPOLYMERS FROM UNSATURATED MONOMERS AND AZO DI-ESTER POLYOLS AND POLYURETHANES PREPARED THEREFROM

[75] Inventors: Kiran B. Chandalia, Hamden; Frank J. Preston, Meriden, both of Conn.

[73] Assignee: Olin Corporation, New Haven, Conn.

[21] Appl. No.: 779,968

[22] Filed: Mar. 22, 1977

[51] Int. Cl.$^3$ .......................... C08L 67/06; C08K 5/06
[52] U.S. Cl. ................... 525/168; 260/33.2 R; 260/33.4 R; 521/137; 525/58; 525/167; 525/440; 526/219; 526/320
[58] Field of Search ................. 260/861, 873, 33.2 R, 260/33.4 R, 167; 526/219, 320; 528/75; 525/10, 41, 34, 902, 11, 445, 440, 168

[56] References Cited

U.S. PATENT DOCUMENTS

| | | | |
|---|---|---|---|
| 3,291,859 | 12/1966 | Tobolsky et al. | 525/440 |
| 3,641,209 | 2/1972 | Ott et al. | 526/219 |
| 3,642,751 | 2/1972 | Logemann et al. | 526/219 |
| 3,649,614 | 3/1972 | Sheppard et al. | 260/861 |
| 3,752,802 | 8/1973 | Sheppard et al. | 260/861 |
| 4,028,344 | 6/1977 | Lange et al. | 516/219 |
| 4,063,012 | 12/1977 | MacLeay et al. | 526/219 |

*Primary Examiner*—Theodore E. Pertilla
*Attorney, Agent, or Firm*—Gordon F. Sieckmann; Donald F. Clements

[57] ABSTRACT

Graft copolymers are prepared by the polymerization of an ethylenically unsaturated monomer, or a mixture of such monomers, in the presence of an azo di-ester polyol. Presence of the azo group in the polyol reactant itself serves as a free radical initiator site for the graft copolymerization reaction. The copolymers formed are utilized in the formulation of polyurethane compositions.

21 Claims, No Drawings

GRAFT COPOLYMERS FROM UNSATURATED MONOMERS AND AZO DI-ESTER POLYOLS AND POLYURETHANES PREPARED THEREFROM

BACKGROUND OF THE INVENTION

1. Field of the Invention

The invention relates to graft copolymer polyols for use in the production of polyurethane polymers. In particular, the present invention relates to novel graft copolymer polyols prepared by reacting an ethylenically unsaturated monomer in the presence of a polyol compound containing an azo linkage, and to the use of these polymer polyols in the production of polyurethanes.

2. Prior Art

A great deal of art has arisen focusing on methods for increasing the overall molecular weight of polyols without seriously affecting chain length and attendant fluidity, by incorporating polymeric materials onto the polyol by grafting. Such grafted copolymer polyol dispersions have proven to be advantageous when used in polyurethane formulations to achieve desirable polyurethane product properties, such as enhanced load bearing and resiliency in foams.

It is known in the art to prepare graft copolymer dispersions from vinyl monomers and polyols and to use these copolymers in the formulation of urethane polymers. For example, U.S. Pat. No. 3,383,351 to Stamberger teaches that ethylenically unsaturated monomers may be polymerized in a polyol medium. As evidenced by Pizzini et al in U.S. Pat. No. 3,823,201, graft copolymers could also be formed by reacting vinyl monomers in polyols containing some degree of unsaturation. An effective amount of free radical catalyst is required in order to initiate these copolymerization reactions. Such free radical-type vinyl polymerization catalysts are, for example, the peroxides, persulfates, perborates, and azo compounds, etc.

It is also known in the art to prepare graft copolymers by treating polymerizable vinyl-type monomers with azo-containing polymers. This is illustrated in U.S. Pat. No. 3,752,802 to Sheppard et al, which shows (see Example X) the preparation of such azo compounds by reaction of an azo-bis diacid chloride, such as trans-4,4'-azobis-(4-cyanovaleryl chloride), with a monohydroxyl-terminated polyether. The prepared azo-containing polymers are reacted with suitable vinyl monomers under conditions where the azo-carbon linkage is decomposed into free radicals at a rate and temperature suitable for polymerizing the vinyl monomer. These graft copolymers are suggested to have utility as stabilizers of solutions of different homopolymers. However, the azo-containing polymers illustrated are not azo di-ester polyols and accordingly do not feature the multiple hydroxyl groups as are necessary for graft copolymers for use in polyurethane formulations; the basic chemistry of polyurethanes is the reaction of a polyfunctional material that has multiple terminal hydroxyl groups with a polyisocyanate to render a product of high molecular weight. The amount of branching and cross-linking of the polymeric product is directly dependent on the number of hydroxyl groups in the original material. By altering the amount of hydroxyl groups, the physical properties of the resulting polyurethane can be varied to form products such as elastic fibers, elastomers, or flexible, semi-rigid, or rigid foams.

SUMMARY OF THE INVENTION

Now, an improvement has been developed whereby a novel graft copolymer is prepared by reacting an azo-containing polyol compound with an ethylenically unsaturated monomer. In the graft copolymerization reaction, the unsaturated monomer is polymerized in the presence of these azo-polyols at a temperature sufficient to rupture the azo linkage to its adjacent carbon. As a result, the polymerized vinyl compounds graft directly on to the polyol chain itself at the site of the ruptured linkage. The presence of the azo group in the polyol itself eliminates the need for an additional free radical catalyst.

Further, according to the invention, the copolymer polyols are used in the formulation of polyurethane compositions, wherein reaction with organic polyisocyanates is effected.

DETAILED DESCRIPTION OF THE PREFERRED EMBODIMENTS

The graft copolymer polyols of the present invention can be prepared by reacting certain azo di-ester polyols with ethylenically unsaturated monomers. This graft copolymer forming reaction can be exemplified by the following illustration using styrene as the monomer reactant and an azo-bis ester polyol prepared from levulinic acid and a polyether triol:

Azo di-ester polyol

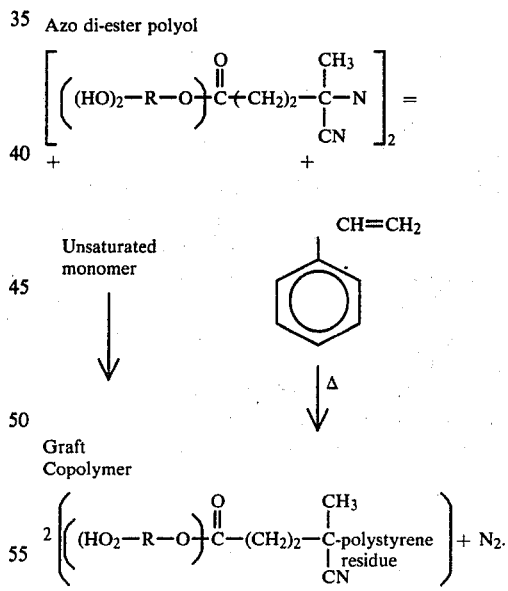

The azo di-ester polyol reactant of the graft copolymerization reaction can be represented by the general formula:

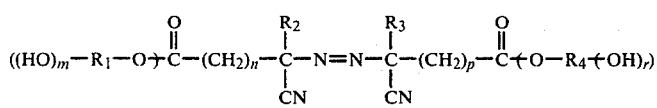

I wherein m and r independently are integers from 2–5, $R_2$ and $R_3$ independently are alkyl of 1–4 carbons, n and p independently are integers from 0–5, and the groups $((HO)_m-R_1-O)-$ and $-(O-R_4-(OH)_r)$ independently are residues of polyols $R_1(OH)_{m+1}$ and $R_4(OH)_{r+1}$, after removal of one hydroxy hydrogen therefrom and wherein $R_1$ and $R_4$ independently represent polyether polymer portions and polyester polymer portions thereof.

These azo di-ester polyol compounds of the above formula include both symmetrical and non-symmetrical azo di-ester polyols. These azo compounds can be prepared by esterifying or transesterifying any suitable polyol or mixtures thereof, with a suitable azo diacid or a corresponding azo diacid halide or ester.

Symmetrical azo-bis ester polyols can be prepared by reacting an azo-bis diacid with a polyol. Unsymmetrical azo di-ester polyols also can readily be formulated by reacting an unsymmetrical azo diacid with a polyol or a mixture of polyols or by reacting an azo-bis diacid with a mixture of polyols. The azo-bis ester polyol reactants are preferred.

In order to simplify the presentation herein, the azo-bis ester polyols have been selected to be discussed in more specific detail below. The principles presented are readily adaptable to unsymmetrical azo di-ester polyols. The symmetrical or azo-bis ester polyol reactant can be represented by the formula:

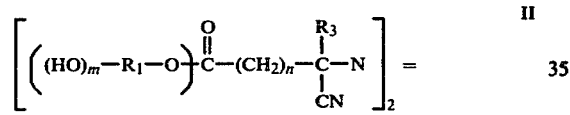

II wherein m, n, $R_3$, and $((HO)_m-R_1-O)-$ are as defined above in Formula I.

The azo-bis diacid reactant used in preparing the azo-bis ester polyol of Formula II can itself be prepared from keto acids, according to known procedures (e.g., *J. Chem. Soc.*, [London], [1955], p. 4256), by a process which involves first reacting the keto acid with hydrazine in the presence of sodium cyanide. The ketone functionality presumably forms an azine in reaction with the hydrazine which, in turn, then adds hydrogen cyanide to result in a substituted hydrazine.

This reaction can be illustrated by the following example, where n and $R_3$ are as defined in Formula II above:

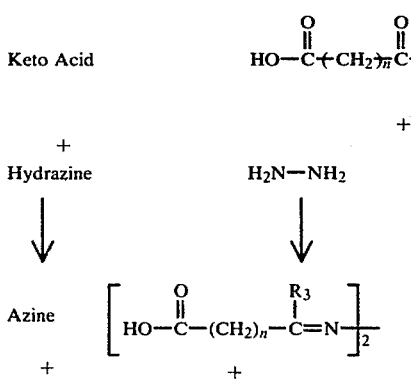

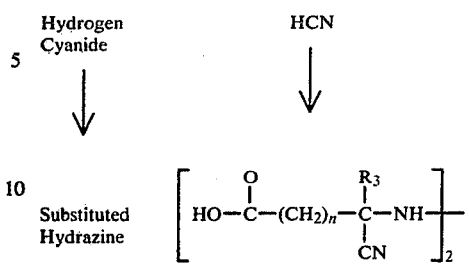

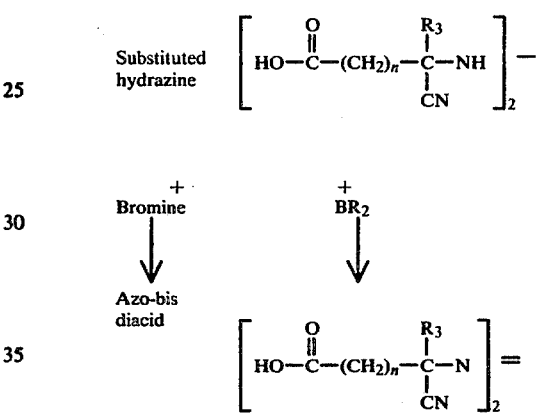

Any keto acid may be used. Typical keto acids which may be used include levulinic acid, pyruvic acid, 2-keto butanoic acid, 2-keto pentanoic acid, 2-keto hexanoic acid, 3-keto butanoic acid, 5-keto hexanoic acid, 6-keto heptanoic acid, 7-keto octanoic acid, 7-keto undecanoic acid, and the like. Preferred keto acids include levulinic acid, pyruvic acid, 2-keto butanoic acid, 2-keto pentanoic acid, and the like.

In order to esterify the diacid, it may first be converted to the diacid halide by substituting the —OH of the carboxylic acid group with a halide. Thionyl chloride is particularly convenient for this purpose, since the by-products formed besides the diacid chloride are gaseous ($SO_2$+HCl) and thus can easily be separated out. Any excess of the low-boiling thionyl chloride is readily removable by distillation. The following shows an example of a diacid chloride preparation, wherein n and $R_3$ are as defined in Formula II above:

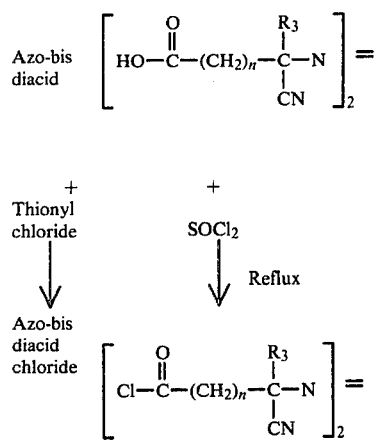

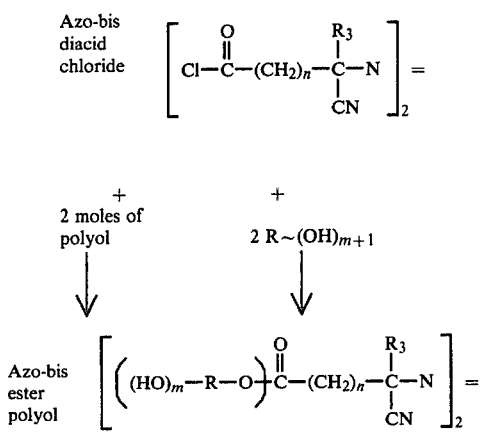

Alternatively, the azo-bis diacid can first be esterified with a low molecular weight alcohol, such as methanol and the like, and then transesterified with the polyol.

In a further modification, the azo diacid may be directly esterified to the azo di-ester polyol by reaction with polyol in the presence of a strong acid catalyst. Any strong mineral acid may be used. Hydrochloric acid in a concentration of 1–5% has been found to be a favorable direct esterification medium. Direct esterification features an operational single-step advantage. Also, gaseous HCl is not a by-product as in the alternate acid chloride route.

The polyol reactant which is used in preparing the azo di-ester polyols of the invention can be any such compound, including mixtures of two or more such compounds, having 3–6 hydroxyl groups and preferably an average equivalent weight from about 250 to about 5000. This includes polyester polyols and polyether polyols. However, the polyether polyols are generally preferred.

The polyester polyols include the products of reacting polycarboxylic acids with polyhydric alcohols. Illustrative polycarboxylic acids include, for example, oxalic, malonic, succinic, glutaric, adipic, pimelic, suberic and azelaic acids and the like. Illustrative polyhydric alcohols include various triols, tetrols, and higher-functionality alcohols, such as glycerol, trimethylolpropane, pentaerythritol, sorbitol, mixtures thereof and the like.

The polyether polyols, the use of which is preferred herein, include various polyoxyalkylene polyols and mixtures thereof. These can be prepared, according to well-known methods, by condensing an alkylene oxide, or a mixture of alkylene oxides using random or stepwise addition, with a polyhydric initiator or mixture of initiators. Illustrative alkylene oxides include ethylene oxide, propylene oxide, butylene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiators used in preparing the polyether polyol reactant can be any such material which has from 3 to 6 active hydrogens. This includes (a) the aliphatic triols such as glycerol, trimethylolpropane, triethylolpropane, trimethylolhexane, and the like, (b) higher-functionality alcohols such as sorbitol, pentaerythritol, methyl glucoside, and the like, (c) the polyamines such as tetraethylene diamine, and (d) the alkanolamines such as diethanolamine, triethanolamine, and the like.

A preferred group of polyhydric initiators for use in preparing the polyether polyol reactant is one which comprises aliphatic triols such as glycerol, trimethylolpropane, and the like.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average equivalent weight of about 250–5000, preferably about 700–3000, and more preferably about 1000–1500. The catalyst is thereafter preferably removed, leaving a polyether polyol which is ready for use in preparing the azo di-ester polyols of the invention.

The esterification reaction conditions will vary according to the particular reactants employed. Temperatures should be held below the thermal decomposition temperature of the azo-bis acid, so that premature rupture of azo-carbon linkages is not initiated prior to the graft co-polymerization step. Generally, this temperature is below about 70° C. Further details concerning the preparation of the azo di-ester polyol reactant are provided in co-pending application, Ser. No. 780,213, filed Mar. 22, 1977, now U.S. Pat. No. 4,094,868, which is being filed concurrently herewith.

In order to form the graft copolymers of the present invention the azo di-ester polyols are treated with an ethylenically unsaturated monomer or a mixture of such monomers, usually in the presence of additional polyol. The monomers useful in the copolymerization process are polymerizable monomers characterized by the presence of at least one polymerizable ethylenic unsaturated group of the type $>C=C<$. Any such monomer or mixture of monomers may be used.

Representative ethylenically unsaturated monomers which may be employed in the present invention include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethylα-ethoxyacrylate, methyl α-acetaminoacrylate, butyl acrylate, 2-ethylhexylacrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2′-vinyloxy diethyl ether, vinyl 2-ethylmercaptoethyl ether, vinyl methyl ketone, vinyl ethyl ketone, vinyl phosphonates such as bis (β-chloroethyl)vinyl phosphonate, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumerate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Preferred monomers include styrene, acrylonitrile, vinyl chloride, methyl methacrylate, hydroxy ethyl acrylate, butadiene, isoprene, chloroprene, and the like. Styrene and acrylonitrile are particularly preferred.

The reaction temperature for the copolymerization should be at or above the thermal decomposition temperature of the particular azo di-ester polyol employed. Such temperature normally will range from about 70° C. to about 150° C. and preferably about 80° to 110° C. In effecting the reaction, the presence of a free radical catalyst is not required for the copolymerization reaction, since the azo-carbon linkage within the chain of the polyol ester itself is broken at the reaction temperature and the free radicals formed serve as suitable initiators for polymerizing the monomer. Hence, grafting of the vinyl polymers directly on to the polyol chain itself at the site of the severed azo-carbon bond is accomplished. This eliminates dependency of grafting through hydrogen abstraction alone, which is much more random and indistinct than the direct method here provided.

As initially shown above, the grafting reaction may be illustrated by the following example, where n, $R_3$ and $((HO)_m$—$R_1$—$O$)— are as defined in Formula II above:

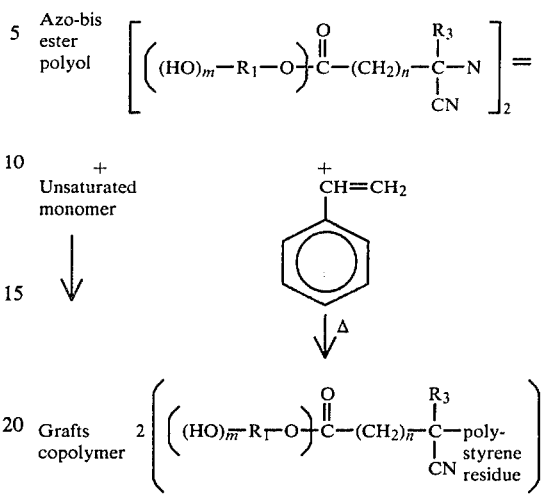

The amounts of the respective reactants in the graft copolymerization reaction determine the extent of copolymerized product present in the final graft copolymer dispersion. By varying the relative reactant proportions, a range of graft copolymerized products can be formed, which, in turn can be utilized in formulations to produce various polyurethane properties.

The azo di-ester polyol may be reacted alone with unsaturated monomer, but, preferably it is supplemented with additional un-esterified polyol, selected from the polyol reactants defined previously above. The ratio of azo di-ester polyol to monomer in the copolymerization reaction can vary widely depending on the amount of copolymer required and the ensuing attendant polyurethane properties desired. From 0.01 to 100 percent of the azo di-ester polyol, based on the weight of total polyol, may be used. In forming the azo di-ester polyol reactant, it is advantageous to use excess polyol, which preferably is allowed to remain with the product to result in an azo di-ester polyol-unreacted polyol mixture. An advantageous reaction scheme is then to add monomer and the azo di-ester polyol-unesterified polyol mixture separately or combined to a heated reactor which contains additional unesterified polyol, in order to produce a graft copolymer of monomer and polyol dispersed in a polyol medium.

The amount of ethylenically unsaturated monomer used in the polymerization reaction preferably ranges from about 1 to 30 percent, and most preferably from about 3 to 25 percent, based on the weight of total polyols.

As stated earlier, the need for free radical catalyst is eliminated by utilizing the azo di-ester polyol of the present invention. When these azo-containing polyols are reacted with suitable vinyl monomers under proper conditions, the azo-carbon linkages are decomposed into free radicals at a rate suitable for polymerizing the vinyl monomers. Co-reaction and subsequent grafting can take place at the reactive broken linkage site provided on the polyol chain itself. This results in positive grafting of the unsaturated polymers on the polyol chain and circumvents dependency on less distinct grafting based only on hydrogen abstraction.

The graft copolymer dispersions of the present invention are particularly suited for use in polyurethane formulations, as shown in Examples VII-XI below. The presence of the multiple terminal hydroxyl groups allows the polyurethane forming reaction with organic polyisocyanates. Modification of the amount of terminal hydroxyls causes variation of resulting physical properties of polyurethane products. The amount of branching and cross-linking is directly dependent on the number of hydroxyl groups in the original resin. Properties can be varied to form polyurethane products such as elastic fibers, elastomers, or flexible, semi-rigid, or rigid foams.

Although the invention is of utility in the preparation of non-cellular polyurethanes as well as polyurethane foams, the preparation of foams according to the invention is preferred.

In the preparation of the present polyurethane foams, either of the general forming processes, the "one-shot" or the "prepolymer" processes, may be utilized. Any combination of graft copolymer, additional polyol, organic polyisocyanate, foaming agent, catalyst, and other reactants capable of forming a polyurethane foam forming reaction mixture can be employed.

The organic polyisocyanates used in the polyurethane foams of this invention include toluene diisocyanate, such as the 80:20 or the 65:35 isomer mixture of the 2,4- and 2,6-isomeric forms, ethylene diisocyanate, propylene diisocyanate, methylenebis-(4-phenyl isocyanate), 3-3'-bitoluene-4,4'diisocyanate, hexamethylene diisocyanate, naphthalene 1,5-diisocyanate, the polymeric isocyanates such as polyphenylene polymethylene isocyanate, and the like, and mixtures thereof. The amount of isocyanate employed in the present process should generally be sufficient to provide at least about 0.7 NCO group per hydroxy group in the reaction system, which includes the graft copolymers, polyols, as well as any additional material and/or foaming agent present. In practice, polyisocyanate is usually used in a proportion to provide no more than about 1.25 NCO groups per each hydroxy group. A 100 multiple of the ratio of NCO to OH groups in the reaction system is referred to as the "index."

Any suitable foaming agent, or mixture of foaming agents may be employed. These include inorganic foaming agents, such as water, and organic foaming agents containing up to seven carbon atoms such as the halogenated hydrocarbons and the low molecular weight alkanes, alkenes, and ethers. Illustrative organic agents include mono-fluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether, diisopropyl ether, mixtures thereof and the like. Water and the low molecular weight polyhalogenated alkanes, such as monofluorotrichloromethane and dichlorodifluoromethane, are preferred. The amount of foaming agent can be varied over a wide range, as is known in the prior art, depending on the density in the foam product.

The catalyst employed in preparing the foams of the invention may be any of the catalysts known to be useful for this purpose, including tertiary amines, organo-metallic salts, and mixtures of an organo-metallic salt with one or more tertiary amine, the latter being preferred. Typical tertiary amines include for example triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1," methyldicyclohexylamine, N-cyclohexylmorpholine, dimethyldicyclohexylamine, methyldiethanolamine, mixtures of dimethylcyclohexylamine and 2(3-pentyl)-1-dimethylaminocyclohexane such as may be purchased commercially under the trademark "Polycat," bis(dimethylaminoethylpropylether), mixtures of triethylene diamine and dipropylene glycol such as the 1:2 and 1:4 weight ratio mixtures which may be purchased commercially under the trademarks Dabco 33LV and Dabco 8020, respectively, bis(dimethylaminopropylether), and mixtures of these catalysts. The preferred tertiary amine catalysts are triethylenediamine, mixtures of triethylenediamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1–1.5, and preferably about 0.25–0.75, parts per 100 parts by weight of the total polyol which is employed in preparing the foam.

Typical organo-metallic salts include for example the salts of tin, titanium, antimony, aluminum, cobalt, zinc, bismuth, lead, and cadmium, the tin salts, i.e., stannic and stannous salts, being preferred. Illustratively such salts include the octoates, dilaurates, diacetate, dioctoates, oleates, and neodeconates of these metals, the octoates being preferred. The organometallic salt catalyst is used in a proportion of about 0–0.5, and preferably about 0.05–0.2, parts per 100 parts by weight of total polyol which is employed in the preparation of the foam.

It is preferred in the preparation of the polyurethane foams of the invention to employ minor amounts of a conventional surfactant in order to further improve the cell structure of the polyurethane foam. Typical of such surfactants are the silicone oils and soaps, and the siloxane-oxyalkylene block copolymers. U.S. Pat. No. 2,834,748 and T. H. Ferrigno, *Rigid Plastic Foams* (New York: Reinhold Publishing Corp., 1963), pp. 34–42, disclose various surfactants which are useful for this purpose. A preferred group of surfactants are the polysiloxanes such as may be purchased under the trademark "Niax L-5303." Generally up to two parts by weight of the surfactant are employed per 100 parts of total polyol.

The following examples are provided to further illustrate the invention. All parts and percentages are by weight unless otherwise specified.

PREPARATION OF AZO-BIS ESTER POLYOL BY DIRECT ESTERIFICATION

EXAMPLE I

1. Preparation of Polyether Polyols
   a. Polyether triol A was prepared from glycerol by base catalyzed block addition of propylene oxide capped with ethylene oxide such that the ethylene oxide content was approximately 14% and the primary hydroxyl content was approximately 70%. Final OH number was 37 mg KOH/g.
   b. Polyether triol B was prepared from glycerol by base catalyzed block addition of propylene oxide capped with ethylene oxide such that the ethylene oxide content was approximately 9.8% and the primary hydroxyl content was approximately 55%. Final OH number was 37.

c. Polyether triol C was prepared from glycerol by base catalyzed random addition of propylene oxide and ethylene oxide such that the ethylene oxide content was approximately 5% and the primary hydroxyl content was approximately 0%. Final OH number was 56.

d. Polyether triol D was prepared from glycerol by base catalyzed block addition of propylene oxide capped with ethylene oxide such that the ethylene oxide content was approximately 11% and the primary hydroxyl content was approximately 55%. Final OH number was 56.

2. Preparation of Azo-Bis Ester Polyols-HCl Catalysis a. 3.0 g of 4,4'-azo-bis-(4-cyanovaleric acid) was mixed in a 500 ml three-neck flask with 240 g of polyol A. This is a 5:1 molar ratio of polyol to azo acid. The flask was fitted with an inlet sparge tube for gaseous HCl, a mechanical stirrer, a thermometer and an outlet tube for HCl, which was vented into a drain with constant water flow. The flask was heated by an oil bath to 40° C. and HCl flow begun. An exotherm was noted and the temperature rose to 55°-60° C. where it was maintained with moderate HCl flow for about three hours or until the HCl concentration reached about five percent by weight. During this period, the azo acid gradually dissolved and the polyol solution changed to an amber color.

After about three hours, a clear solution was observed. Nitrogen gas was then passed through the sparge tube while maintaining temperature at 55°-60° C. From time to time, the exit stream was tested with wet litmus paper to detect traces of HCl, however, a more sensitive indicator was odor. After approximately three to four hours, HCl elimination was complete. A vacuum was then imposed on the system for 15 minutes to remove all gases from the system. On cooling, the polyol solution turned hazy. A sample of azo-bis ester polyol A was withdrawn for various analyses.

| Gel Permeation Chromatography | OH No. mg KOH/g | Acid No. mg KOH/g |
|---|---|---|
| 86% 4600 (M.W.) 14% 8300 (M.W.) | 31.3 | 1.0 |

The material was treated with 1.2 g of magnesol and 1.2 g of supercel for one hour and then filtered through Whatman No. 1 filter paper. The product obtained was clear. The final acid number of the azo product was 0.26 mg KOH/g.

b. Polyol B was reacted using the same general scheme as outlined above. A 2.5:1 molar ratio of polyol to azo acid was used. Analyses of the final product yielded the following data:

| Gel Permeation Chromatography | OH No. mg KOH/g | Acid No. mg KOH/g |
|---|---|---|
| 76% 4500 (M.W.) 24% 6000 (M.W.) | 30.6 | 1.0 | c. Polyol C was reacted using the same general scheme as outlined above. A 2.5:1 molar ratio of polyol to azo acid was used. Analyses of the final product yielded the following data:

| Gel Permeation Chromatography | OH No. mg KOH/g | Acid No. mg KOH/g |
|---|---|---|
| 78% 3000 (M.W.) 22% 4500 (M.W.) | 44.1 | 2.1 | d. Polyol D was reacted using the same general scheme as outlined above. A 2.5:1 molar ratio of polyol to azo acid was used. Analyses of the final product yielded the following data:

| Gel Permeation Chromatography | OH No. mg KOH/g | Acid No. mg KOH/g |
|---|---|---|
| 67% 3000 (M.W.) 33% 4900 (M.W.) | 40.2 | 1.7 |

EXAMPLE II

Preparation of Azo-Bis Ester Polyols-H2SO4 Catalysis 3.0 g of 4,4'-azo-bis-(4-cyanovaleric acid) was mixed with 240 g of polyol A (Example I—5:1 molar ratio of polyol to acid) and 0.5 g of $H_2SO_4$ catalyst (0.2% by weight) in a 500 ml round bottom flask fitted to a rotary evaporator with constant temperature bath. The reaction conditions were five hours/60° C./~18 mm Hg. After approximately four hours of heating, solution of the azo acid was observed and the reaction was continued for an additional hour. Samples submitted for analyses indicated the following:

| Gel Permeation Chromatography | OH No. mg KOH/g | Acid No. mg KOH/g |
|---|---|---|
| 91% 4700 (M.W.) 9% 7700 (M.W.) | 27 | 4.81 (Total) |

EXAMPLE III

The general scheme of the reaction as illustrated in Example II was repeated, using, however, five percent by weight $H_2SO_4$ mineral acid catalyst.

Product samples submitted for analyses indicated the following:

| Gel Permeation Chromatography | OH No. mg KOH/g | Acid No. mg KOH/g |
|---|---|---|
| 78.1% 4600 (M.W.) 13.0% 8000 (M.W.) 8.9% 1000 (M.W.) | 26.7 | 48.1 |

Preparation of Azo-Bis Ester Polyols By Transesterification

EXAMPLE IV 3.0 g of 4,4'-azo-bis-(4-cyanovaleric acid methyl ester) was mixed in a 500 ml round bottom flask with 175 g of polyol and 0.3 g of sodium methoxide as catalyst. This is a 4:1 molar ratio of polyol to azo acid. The flask was fitted to a rotary evaporator with constant temperature bath. The reaction conditions were five hours/60° C./~18 mm Hg. Complete solution of the azo compound was noted after four hours. Samples submitted for analyses indicated the following:

| Gel Permeation Chromatography | OH No. mg KOH/g | Base No. mg KOH/g |
|---|---|---|
| 92% 4500 (M.W.) 8% 8000 (M.W.) | 32.2 | 0.04 |

Preparation of Azo-Bis Ester Polyols from Acid Chloride

EXAMPLE V

To a nitrogen purged 1 L round bottom flask, equipped with a drying tube was added 7.55 g (0.024 m) 4,4'-azo-bis-(4-cyanopentanoic acid chloride) dissolved in a 10 g of methylene chloride. To this solution was added 225 g of a polyether triol (OH# 37.4) prepared from glycerol by base catalyzed addition of propylene oxide and ethylene oxide such that the ethylene oxide content is approximately 14% and the primary hydroxyl approximately 70%. The reagents were stirred for two hours at 40°-50° C., then stripped at 45° C. and 1 mm Hg pressure for two hours to remove methylene chloride and gaseous HCl. The resultant pale yellow liquid which was then filtered showed an increase in viscosity and by gel permeation chromatography showed a mass peak at ~8600-9000 M.W. indicating coupling of two polyether triol molecules by esterification with the above-mentioned acid chloride.

EXAMPLE VI

To a nitrogen purged 1000 ml round bottom flask, equipped with a drying tube was added 7.55 g (0.024 m) 4,4'-azo-bis-(4-cyanopentanoic acid chloride) dissolved in 10 g of methylene chloride. To this solution was added 312 g (0.048 m) of a polyether triol (OH# 26) prepared from glycerol by base catalyzed addition of propylene oxide and ethylene oxide such that the ethylene oxide content is approximately 9% and the primary hydroxyl approximately 68%. The reagents were stirred for two hours at 40°-50° C., then stripped at 45° C. and 1 mm Hg pressure for two hours to remove methylene chloride and gaseous HCl. The material was filtered through a Whatman No. 1 filter. The product obtained was a clear yellow material. It showed a mass peak at 13,000 M.W. by gel permeation chromatography indicating coupling of two polyether triol molecules by esterification with the above-mentioned acid cloride. THe saponification number analysis shows a value of 10.75 mg KOH/g, in good agreement with theoretical value of 9.1 mg KOH/g.

Preparation of Graft Copolymers and Polyurethane Products Therefrom

EXAMPLE VII a. As a further purification step, 150 g of the product of Example V was stirred with 15 g anhydrous sodium bicarbonate at 40°-50° C. for four hours. It was then filtered through a millipore size filter. A clear yellow product was obtained which showed no residual 4,4'-azo-bis-(4-cyanopentanoic acid) by gel permeation chromatography.

To a three-neck 500 ml flask equipped with thermometer, stirrer, condenser and feed inlet port were added 327 g of the polyether triol described in Example V. The polyol was heated under a nitrogen atmosphere to 90° C. and a solution of 50 g of the purified material (Example VII a.), dissolved in 45 g acrylonitrile and 15 g styrene were added at a rate of ~2 g/min. maintaining the reaction temperature at 88°-100° C., maintaining this temperature for one hour after the final addition. Any residual volatile material was stripped at 1 mm Hg pressure and 90° C. The resultant opaque polyvinyl graft polyol had a Brookfield viscosity of 1500 cps at 25° C. and a hydroxyl number of 33.5.

b.1 A hand mix flexible urethane foam was prepared by a method common to the art using the following formulation:

|  | Parts By Weight |
|---|---|
| Polyether Triol (Example V) | 80 |
| Graft Polyol from Example VII | 20 |
| Triethylene Diamine[1] | 0.4 |
| Diethanolamine | 0.4 |
| Stannous Octoate | 0.15 |
| Surfactant[2] | 1.0 |
| Water | 2.0 |
| TDI-80[3] [Index] | 109 |

[1]This is a commercially available product sold under the trademark "Dabco 33 LV". It consists primarily of triethylene diamine (⅓) and dipropylene glycol (⅔).
[2]This is a commercially available polysiloxane surfactant sold under the trademark "Niax L-5303".
[3]This is a mixture of toluene diisocyanate isomers (80/20 mixture of 2,4/2,6-isomers).

| Physical Properties |  |
|---|---|
| Density, pcf[1] | 3.11 |
| ILD, Sample Thickness[2] | 4" |
| Load at 25% Deflection | 45.5 |
| Load at 65% Deflection | 99.5 |
| Sag Factor | 2.19 |
| Air Flow, cfm[3] | 2.42 |
| Ball Rebound, %[4] | 67.0 |

[1] Lbs. per cubic foot
[2] Indentation Load Deflection (lbs.) per ASTM D-1564-64T)
Sag factor, a measure of the support of cushioning material is expressed as a ratio of 65% ILD to 25% ILD
[3] Cubic feet per minute per Nopco Air Picnometer Flow Test
[4] Percentage per ASTM D-1564-64T b.2 A hand mix reaction injection molded urethane elastomer was prepared according to the following formulation:

|  | Parts By Weight |
|---|---|
| Graft Polyol from Example VII | 84 |
| MDI Prepolymer[1] | 79.8 |
| 1,4-Butane Diol | 16.0 |
| Alkyl Tin Carboxylate Catalyst[2] | 0.06 |

[1]This is a commercially available 4,4'-diphenylmethane diisocyanate prepolymer sold under the tradename "Mondur PF".
[2]This catalyst is commercially available under the trademark "UL-2".

| Physical Properties |  |
|---|---|
| Density, pcf[1] | 64.0 |
| Tensile Strength[2], psi | 2130 |
| Elongation[3], pc | 130 |
| Tear Strength[4], lbs./in. | 326 |
| Hardness[5], Shore D | 55 |

-continued

| Physical Properties | |
|---|---|
| Clashberg[6], °F. | −20 |

[1] Lbs. per cubic foot per ASTM 1564-64
[2] Lbs. per square inch per ASTM 1564-64
[3] Percent per ASTM 1564-64
[4] Lbs. per linear inch per ASTM 1564-64
[5] Shore Test, D scale
[6] Tangential modulus test

EXAMPLE VIII a. To a three-neck 1000 ml flask equipped with thermometer, stirrer, condenser and feed inlet port were added 110 g of polyether triol B (Example I 1 b.). The polyol was heated under $N_2$ to 100° C. A blend of 112.5 g acrylonitrile, 37.5 g styrene and 240 g of product of Example I 2 b. (azo polyol B) were added at ~0.8 g/min. feed rate. The reaction temperatures maintained at 100° C. throughout. At the end of feeding, one hour post reaction time was allowed. Any residual volatile material was stripped at 1 mm Hg pressure and 100° C. The resultant opaque polyvinyl graft polyol had a Brookfield viscosity of 3750 cps at 25° C. and a OH number of 23 mg KOH/g.

b. A hand mix flexible urethane foam was prepared by a method common to the art using the following formulation[1]:

| | Parts By Weight |
|---|---|
| Polyether Polyol B (Example I 1 b.) | 80 |
| Graft Polyol from Example VIII | 20 |
| Triethylene Diamine | 0.4 |
| Dibutyl Tin Dilaurate | 0.1 |
| Stannous Octoate | — |
| Diethanolamine | 0.8 |
| Surfactant | 1.0 |
| Water | 2.0 |
| TDI-80 [Index] | 109 |

[1] See Example VII for definitions

Foam processing was good. Following foam physicals[1] were obtained.
Compression Deflection, 25%: 0.37 psi
Compression Deflection, 65%: 0.92 psi
Sag Factor: 2.48
Density: 3.02 pcf
[1] See Example VII for definitions

EXAMPLE IX a. To a three-neck 1000 ml flask equipped with thermometer, stirrer, condenser and feed inlet port were added 240 g of polyether triol B (Example I 1 b.). The polyol was heated under $N_2$ to 100° C. A blend of 150 g polyether triol B, 50 g acrylonitrile and 60 g of product of Example I 2 b. (azo polyol B) were added at ~1 g/min. feed rate. The reaction temperature was maintained at 100° C. throughout. At the end of feeding, one hour post reaction time was allowed. Any residual volatile material was stripped at 1 mm Hg pressure and 100° C. The resultant opaque polyvinyl graft polyol had a Brookfield viscosity of 7400 cps at 25° C.

b. A hand mix flexible urethane foam was prepared by a method common to the art using the following formulation[1]:

| | Parts By Weight |
|---|---|
| Polyether Polyol B (Example I 1 b.) | 80 |
| Graft Polyol from Example VIII | 20 |
| Triethylene Diamine | 0.4 |
| Dibutyl Tin Dilaurate | 0.1 |
| Stannous Octoate | — |
| Diethanolamine | 0.8 |
| Surfactant | 1.0 |
| Water | 2.0 |
| TDI-80 [Index] | 109 |

[1] See Example VII for definitions

Foam processing was good. Following foam physicals[1] were obtained.
Compression Deflection, 25%: 0.28 psi
Compression Deflection, 65%: 0.71 psi
Sag Factor: 2.55
Density: 2.73 pcf
Air Flow: 1.20 cfm
Tensile: 11.48 psi
Tear: 1.11 pli
Elongation: 133%
Ball Rebound: 56%
[1] See Example VII for definitions

EXAMPLE X a. To a three-neck 500 ml flask equipped with thermometer, stirrer, condenser and feed inlet port were added 240 g of polyether triol C (Example I 1 c.). The polyol was heated under $N_2$ to 100° C. A blend of 78 g polyether triol C, 825 g of acrylonitrile, 27.5 g styrene and 82 g of product of Example I 2 c. (azo polyol C) were added at ~1 g/min. feed rate. The reaction temperature was maintained at 100° C. throughout. At the end of feeding, one hour post reaction time was allowed. Any residual volatile material was stripped at 1 mm Hg pressure and 100° C. The resultant opaque polyvinyl graft polyol had a Brookfield viscosity of 1000 cps at 25° C. and a OH number of 47 mg KOH/g.

b. A hand mix flexible urethane foam was prepared by a method common to the art using the following formulation[1]:

| | Parts By Weight |
|---|---|
| Polyether Polyol C (Example III 1 c.) | — |
| Graft Polyol from Example X | 100 |
| Triethylene Diamine | 0.25 |
| Dibutyl Ttin Dilaurate | — |
| Stannous Octoate | 0.2 |
| Diethanolamine | — |
| Surfactant | 1.0 |
| Water | 3.0 |
| TDI-80 [Index] | 105 |

[1] See Example VII for definitions

Foam processing was good. Following foam physicals[1] were obtained.
Compression Deflection, 25%: 0.83
Compression Deflection, 65%: 1.55
Sag Factor: 1.88
Density: 2.15
Air Flow: 2.3
Tensile: 22.44
Tear: 2.29
Compression Set, 50%: 3.53
[1] See Example VII for definitions

EXAMPLE XI a. To a three-neck 500 ml flask equipped with thermometer, stirrer, condenser and feed inlet port were added 240 g of polyether triol D (Example I 1 d.). The polyol was heated under $N_2$ to 100° C. A blend of 78 g polyether triol D, 82.5 g acrylonitrile, 27.5 g styrene and 82 g of product of Example I 2 d. (azo polyol D) were added at ~1 g/min. feed rate. The reaction temperature was maintained at 100° C. throughout. At the end of feeding, one hour post reaction time was allowed. Any residual volatile material was stripped at 1 mm Hg pressure and 100° C. The resultant opaque polyvinyl graft polyol had a Brookfield viscosity of 1135 cps at 25° C.

b. A hand mix flexible urethane foam was prepared by a method common to the art using the following formulation[1]:

|  | Parts By Weight |
|---|---|
| Polyether Polyol D (Example I 1 d.) | — |
| Graft Polyol from Example XI | 100 |
| Triethylene Diamine | 0.25 |
| Dibutyl Tin Dilaurate | — |
| Stannous Octoate | 0.2 |
| Diethanolamine | — |
| Surfactant | 1.0 |
| Water | 3.0 |
| TDI-80 [Index] | 105 |

[1] See Example VII for definitions

Foam processing was good. Following foam physicals[1] were obtained.

Compression Deflection, 25%: 0.85
Compression Deflection, 65%: 1.54
Sag Factor: 1.80
Density: 2.12
Air Flow: 0.3
Tensile: 20.98
Tear: 1.87
Compression Set, 50%: 3.93

[1] See Example VII for definitions

We claim:

1. In a process for the preparation of graft copolymer polyols which consists essentially of polymerizing an ethylenically unsaturated monomer or mixtures of such monomers in a polyol, the improvement characterized by polymerizing the unsaturated monomer in the presence of a polyol comprising from 0.01 to 100 percent by weight of an azo di-ester polyol of the formula:

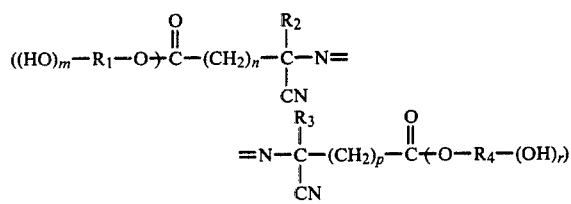

wherein:
m and r independently represent integers from 2 to 5,
n and p independently represent integers from 0 to 5,
$R_2$ and $R_3$ independently represent alkyl of 1-4 carbons, and
$((HO)_m-R_1-O)$ and $(O-R_4-(OH)_r)$ independently represent residues of polyether or polyester polyols $R_1(OH)_{m+1}$ and $R_4(OH)_{r+1}$, having an average equivalent weight ranging from about 250 to 5000, after removal of one hydroxy hydrogen therefrom, wherein $R_1$ and $R_4$ independently represent polyether polymer portions and polyester polymer portions thereof;
said polymerizing occurring at a temperature at or above which the azo-carbon linkages of the azo di-ester polyol the ruptured.

2. The process of claim 1 wherein the polymerizing of unsaturated monomer in the presence of the azo di-ester polyol is conducted in an unesterified polyol medium.

3. The process of claim 1 wherein the monomer is selected from the group consisting of styrene, acrylonitrile, and mixtures thereof.

4. The process of claim 1 wherein the monomer ranges in amount from about 1 to 30 percent based on total polyol weight.

5. The process of claim 1 wherein $((HO)_m-R_1-O)$ and $(O-R_4-(OH)_r)$ of the azo di-ester polyol formula individually represent residues of polyether polyols $R_1(OH)_{m+1}$ and $R_4(OH)_{r+1}$ after removal of one hydroxy hydrogen therefrom.

6. The process of claim 5 wherein the polyether polyols are polyether triols having an average equivalent weight ranging from about 700 to 3000.

7. The process of claim 5 wherein the polyether polyols are polyether triols having an average equivalent weight ranging from about 1000 to 1500.

8. The process of claim 1 wherein m and r, n and p, $R_2$ and $R_3$, and $((HO)_m-R_1-O)$ and $(O-R_4-(OH)_r)$ of the azo di-ester polyol formula respectively represent the same entities, such that the formula represents a symmetrical azo-bis ester polyol.

9. The process of claim 8 wherein the monomer is selected from the group consisting of styrene, acrylonitrile, and mixtures thereof.

10. The process of claim 9 wherein the monomer ranges in amount from 1 to 30 percent based on total polyol weight.

11. The process of claim 10 wherein $((HO)_m-R_1-O)$ and $(O-R_4-(OH)_r)$ of the azo-bis ester polyol formula represent a residue of a polyether polyol.

12. The process of claim 11 wherein the polyether polyol is a polyether triol having an average equivalent weight between about 700 to 3000.

13. The process of claim 12 wherein the polyether polyol is a polyether triol having an average equivalent weight between about 1000 and 1500.

14. The process of claim 8 wherein the azo-bis ester polyol is characterized by the formula:

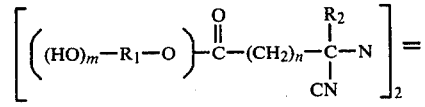

wherein:
m represents an integer from 2 to 5,
$((HO)_m-R_1-O)$ represents a residue of a polyether polyol $R_1(OH)_{m+1}$ after removal of one hydroxy hydrogen therefrom,
n represents an integer from 0-2, and
$R_2$ represents alkyl from 1-3 carbons;
said polymerizing occurring at a temperature from about 70° to 150° C.

15. The process of claim 14 wherein the azo-bis ester polyol is characterized by the formula:

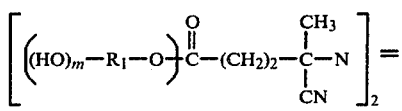

wherein:
m represents the integer 2, and
$((HO)_m$—$R_1$—$O)$— represents a residue of a polyether triol having an equivalent weight between about 1000 and 1500 after removal of one hydroxy hydrogen therefrom.

16. A graft copolymer prepared according to the process of claim 1.

17. A graft copolymer dispersion prepared according to the process of claim 1, wherein excess polyol is employed to form an azo di-ester polyol-unreacted polyol mixture and wherein said unsaturated monomer and azo di-ester polyol-unreacted polyol mixture are polymerized to produce a graft copolymer of unsaturated monomer and polyol dispersed in a polyol medium.

18. A graft copolymer dispersion prepared according to the process of claim 2, wherein excess polyol is employed to form an azo di-ester polyol-unreacted polyol mixture and wherein said unsaturated monomer and azo di-ester polyol-unreacted polyol mixture are polymerized to produce a graft copolymer of unsaturated monomer and polyol dispersed in a polyol medium.

19. A graft copolymer dispersion prepared according to the process of claim 8, wherein excess polyol is employed to form an azo di-ester polyol-unreacted polyol mixture and wherein said unsaturated monomer and azo di-ester polyol-unreacted polyol mixture are polymerized to produce a graft copolymer of unsaturated monomer and polyol dispersed in a polyol medium.

20. A graft copolymer dispersion prepared according to the process of claim 14, wherein excess polyol is employed to form an azo di-ester polyol-unreacted polyol mixture and wherein said unsaturated monomer and azo di-ester polyol-unreacted polyol mixture are polymerized to produce a graft copolymer of unsaturated monomer and polyol dispersed in a polyol medium.

21. A graft copolymer dispersion prepared according to the process of claim 15, wherein excess polyol is employed to form an azo di-ester polyol-unreacted polyol mixture and wherein said unsaturated monomer and azo di-ester polyol-unreacted polyol mixture are polymerized to produce a graft copolymer of unsaturated monomer and polyol dispersed in a polyol medium.

* * * * *

UNITED STATES PATENT AND TRADEMARK OFFICE
CERTIFICATE OF CORRECTION

PATENT NO. : 4,258,148

DATED : March 24, 1981

INVENTOR(S) : Kiran B. Chandalia and Frank J. Preston

It is certified that error appears in the above—identified patent and that said Letters Patent is hereby corrected as shown below:

Column 9, line 29, "3-3'-bitoluene-4,4'diisocyanate" should read --3,3'-bitoluene-4,4'-diisocyanate--.

Column 9, line 59, after "density" insert --desired--.

Column 13, line 53, "cloride. THe" should read --chloride. The--.

Column 14, lines 37-39, "Load at 25% Deflection", "Load at 65% Deflection" and "Sag Factor" should be indented.

Column 14, line 43, in Footnote 2, "(lbs.) per" should read --(lbs. per--.

Column 14, line 48, the period after "urethane" should be deleted.

Column 16, line 5, "Graft Polyol from Example VIII" should read --Graft Polyol from Example IX--.

Column 16, lines 32-33, "825 g of acrylonitrile" should read --825 g acrylonitrile--.

UNITED STATES PATENT AND TRADEMARK OFFICE
CERTIFICATE OF CORRECTION

Page 2 of 2

PATENT NO. : 4,258,148
DATED : March 24, 1981
INVENTOR(S) : Kiran B. Chandalia and Frank J. Preston It is certified that error appears in the above—identified patent and that said Letters Patent is hereby corrected as shown below:

Column 16, line 52, "Dibutyl Ttin Dilaurate" should read --Dibutyl Tin Dilaurate--.

Column 17, line 66, claim 1, "$((HO)_m-R_1-O)$ and $(O-R_4-(OH)_r)$" should read --$((HO)_m-R_1-O\!\!+$ and $\!\!+\!O-R_4-(OH)_r)$--.

Column 18, line 8, claim 1, "the ruptured" should read --are ruptured--.

Column 18, lines 55-59, claim 14, that portion of the formula reading

" $\begin{array}{c} R_2 \\ | \\ -C- \\ | \\ CN \end{array}$ " should read -- $\begin{array}{c} R_2 \\ | \\ -C- \\ | \\ CN \end{array}$ --.

Signed and Sealed this

Seventh Day of September 1982

[SEAL]

Attest:

GERALD J. MOSSINGHOFF

Attesting Officer

Commissioner of Patents and Trademarks